United States Patent
Hudack et al.

(10) Patent No.: US 9,535,944 B2
(45) Date of Patent: *Jan. 3, 2017

(54) ASSOCIATING RECEIVED CONTACT INFORMATION WITH USER PROFILES STORED BY A SOCIAL NETWORKING SYSTEM

(71) Applicant: Facebook, Inc., Menlo Park, CA (US)

(72) Inventors: Michael Nicholas Hudack, San Francisco, CA (US); Christopher Turitzin, San Francisco, CA (US); Edward Baker, Palo Alto, CA (US); Hao Xu, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/135,372

(22) Filed: Apr. 21, 2016

(65) Prior Publication Data

US 2016/0239535 A1 Aug. 18, 2016

Related U.S. Application Data

(63) Continuation of application No. 13/730,758, filed on Dec. 28, 2012, now Pat. No. 9,338,250.

(51) Int. Cl.
*H04L 29/08* (2006.01)
*G06F 17/30* (2006.01)
*H04L 29/12* (2006.01)

(52) U.S. Cl.
CPC ..... *G06F 17/30386* (2013.01); *H04L 61/1594* (2013.01); *H04L 67/306* (2013.01)

(58) Field of Classification Search
CPC .................................................... H04L 67/306
See application file for complete search history.

(56) References Cited

U.S. PATENT DOCUMENTS

| | | | |
|---|---|---|---|
| 2006/0224675 A1 | 10/2006 | Fox et al. | |
| 2010/0281113 A1* | 11/2010 | Laine | G06Q 10/10 709/204 |

(Continued)

OTHER PUBLICATIONS

United States Office Action, U.S. Appl. No. 13/730,758, Apr. 24, 2015, eighteen pages.

(Continued)

*Primary Examiner* — Chris Parry
*Assistant Examiner* — Stephen Houlihan
(74) *Attorney, Agent, or Firm* — Fenwick & West LLP

(57) ABSTRACT

A social networking system receives contact information from a social networking system user. The received contact information is stored and associated with a user profile in the social networking system including information matching at least a portion of the stored content information. This increases the information associated with the user profile. Subsequently received content information is compared to user profiles and stored contact information associated with one or more user profiles. User profiles including information matching at least a portion of the subsequently received content information or associated with stored contact information matching at least a portion of the subsequently received content information are identified as potential connections for the user providing the subsequently received contact information.

7 Claims, 2 Drawing Sheets

(56) References Cited

U.S. PATENT DOCUMENTS

2010/0306185 A1    12/2010  Smith et al.
2011/0078190 A1*  3/2011  Samuel .................. G06Q 10/06
                                                               707/780
2012/0284341 A1*  11/2012  Masood ................ G06Q 50/01
                                                               709/205

OTHER PUBLICATIONS

United States Office Action, U.S. Appl. No. 13/730,758, Nov. 14, 2014, eighteen pages.

* cited by examiner

ASSOCIATING RECEIVED CONTACT INFORMATION WITH USER PROFILES STORED BY A SOCIAL NETWORKING SYSTEM

RELATED APPLICATIONS

This application is a continuation of U.S. patent application Ser. No. 13/730,758, filed Dec. 28, 2012, titled "Associating Received Contact Information with User Profiles Stored by a Social Networking System," which is hereby incorporated by reference in its entirety.

BACKGROUND

This invention relates generally to social networking systems, and more specifically to managing contact information associated with social networking system users.

Social network systems, or social utilities that track and enable online connections between users (including people, businesses, and other entities), have become increasingly prevalent. In particular, social networking systems allow their users to associate themselves with other users to create a web of connections among the social networking system users. For example, social networking system users may establish connections with each other based on one or more common attributes in user profiles, such as geographic location, employer, job type, age, musical preferences, interests, online games, or other attributes. Social networking system users connected to each other may exchange content with each other.

Some social networking systems also include tools identifying other users with which a user may establish a connection or identifying additional persons for a user to invite to establish an account with the social networking system. Many of these tools allow a social networking system user to import contact information describing the social networking system user's contacts outside of the social networking system. For example, a social networking system user imports an address book or other e-mail contact list. The social networking system compares characteristics of the imported contact list to user profile information maintained for other social networking system users. Social networking system users with user profile information matching a portion of the contact information and not connected to the user are identified to the user for establishing a connection.

However, many social networking system users have incomplete user profile information or out of date user profile information. Additionally, some social networking system users store multiple pieces of information corresponding to different portions of their user profiles, making it difficult to identify profile information matching imported content information. For example, a user profile may include multiple e-mail addresses for a social networking system user, making it difficult to identify a current e-mail address for matching to imported contact information. Hence, conventional social networking systems may fail to identify additional users for connecting to a user based on contact information imported by the user.

SUMMARY

A social networking system allows its users to provide a contact list used for communicating via systems external to the social networking system. The contact list includes one or more contact entries that each include contact information. For example, a user imports an electronic mail address book to the social networking system identifying different contacts each having an email address, a name, and/or any other suitable information. In addition to identifying additional users with which the user may establish a connection using the imported contact information, the social networking system identifies a user profile including at least some information matching at least a portion of the contact information in a contact entry and associates the contact information with the user profile. This allows the social networking system to augment user profile information with additional information for identifying user profiles for connecting to a user.

The social networking system compares contact information for contact entries received from an importing user to user profiles maintained by the social networking system. The imported contact entries, and their associated contact information, may be stored by the social networking system. For example, the contact entries are stored in a user profile associated with the importing user. User profiles including information matching at least a portion of the contact information for a contact entry are identified and presented to the importing user with a recommendation for the importing user to establish a connection with one or more users associated with the identified user profiles. Additionally, the social networking system associates a stored contact entry with a user profile including information matching contact information for the stored contact entry.

When additional contact entries, each including contact information, are received from an additional user of the social networking system, the contact information of an additional contact entry is compared to user profiles to identify matching information and is also compared to stored contact entries associated with one or more user profiles. Hence, received contact information is associated with user profiles having matching information, allowing subsequent comparisons of additional contact information to information in both user profiles and previously imported contact information associated with a user profile. If information in a user profile or in a stored contact entry associated with the user profile match a portion of the information in an additional contact entry, the social networking system may provide a message to the additional user suggesting establishment of a connection with a user associated with the user profile. Hence, the social networking system updates information associated with user profiles as users provide contact lists to the social networking system, increasing the amount of information used to suggest connections.

The Figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system offers its users the ability to communicate and interact with other users of the system. In use, users join the social networking system and then add connections to a number of other users to which they desire to be connected. To aid users in establishing connections to other users, the social networking system may receive a contact list from a user and compare information from the contact list with user profiles maintained by the social networking system. The social networking system identifies user profiles including information matching information in the received contact list and suggests that the user from which the contact list was received form a connection with one or more users associated with the identified user profiles.

However, user profiles may include incomplete or outdated information, limiting the social networking system's ability to identify other social networking system users for connecting to an importing user. To more accurately identify users, the social networking system stores contact entries received from an importing user and associates a stored contact entry with a user profile including information matching information in the contact entry. Subsequently received contact entries are compared to user profiles and stored contact entries associated with the user profile to identify matching information. If information in a user profile or in a stored contact entry associated with the user profile matches a received contact entry, a user associated with the user profile is identified for establishing a connection. Associating received contact entries with user profiles supplements user profiles with received content information, allowing identification of more potential connections to users and increasing user interaction with the social networking system.

System Architecture

Figure 1:
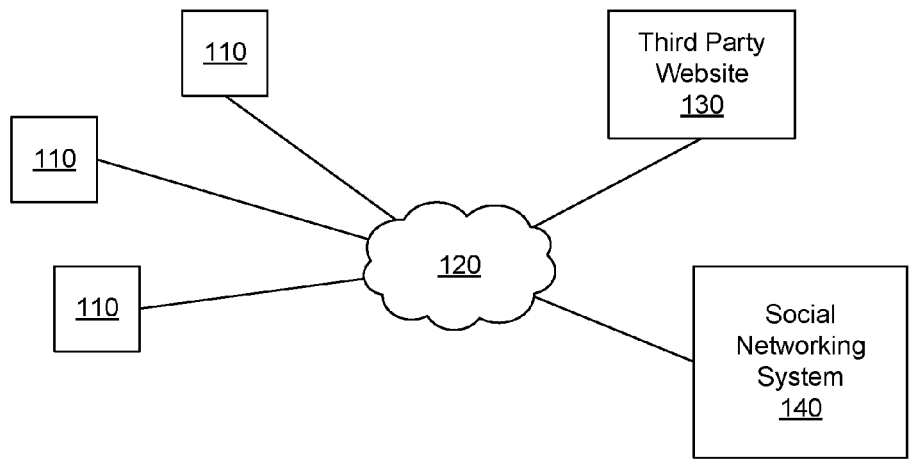
FIG. 1 is a block diagram of a system environment in which a social networking system operates, in accordance with an embodiment of the invention.

FIG. 1 is a high level block diagram illustrating a system environment 100 for a social networking system 140. The system environment 100 comprises one or more client devices 110, a network 120, one or more third-party websites 130 and the social networking system 140. In alternative configurations, different and/or additional components may be included in the system environment 100. The embodiments described herein may be adapted to online systems that are not social networking systems.

A client device 110 is a computing devices capable of receiving user input as well as transmitting and/or receiving data via the network 120. In one embodiment, a client device 110 is a conventional computer system, such as a desktop or laptop computer. In another embodiment, a client device 110 may be a device having computer functionality, such as a personal digital assistant (PDA), mobile telephone, smartphone or similar device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) that runs on the native operating system of the client device 110, such as IOS® or ANDROID™.

The client devices 110 are configured to communicate via the network 120, which may comprise any combination of local area and/or wide area networks, using both wired and wireless communication systems. In one embodiment, the network 120 uses standard communications technologies and/or protocols. Thus, the network 120 may include links using technologies such as Ethernet, 802.11, worldwide interoperability for microwave access (WiMAX), 3G, 4G, code division multiple access (CDMA), digital subscriber line (DSL), etc. Similarly, the networking protocols used on the network 120 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 120 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec).

A third party website 130 may be coupled to the network 120 for communicating with the social networking system 140, which is further described below in conjunction with FIG. 2. In one embodiment, the third party website 130 is an electronic mail server or another messaging server receiving messages from users and routing the received messages to other users for presentation via client devices 110. The third party website 130 may maintain accounts for various users and directs messages to various user accounts to communicate messages or other content to the users.

Figure 2:
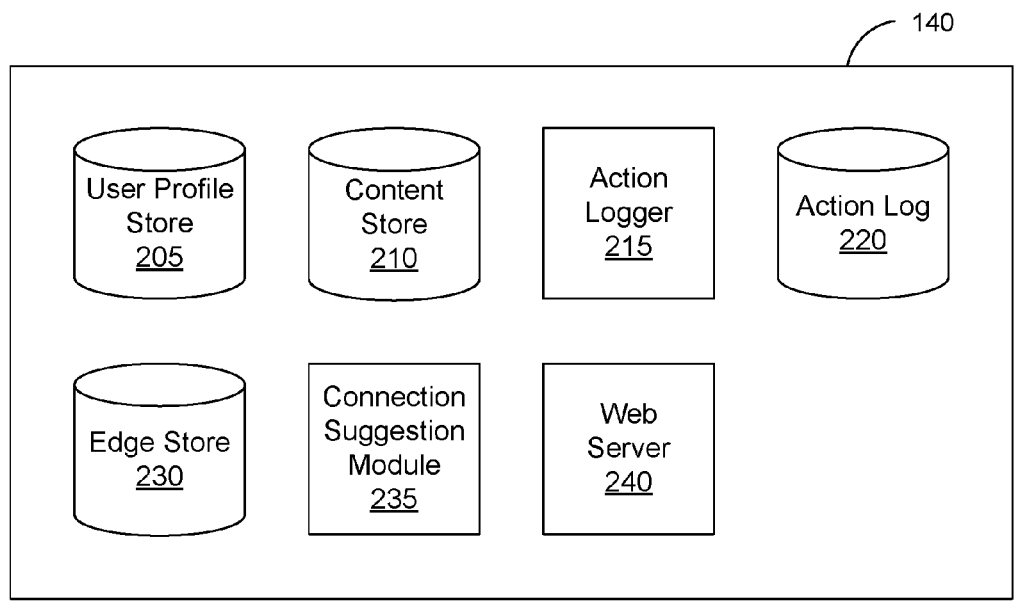
FIG. 2 is a block diagram of a social networking system, in accordance with an embodiment of the invention.

FIG. 2 is an example block diagram of an architecture of the social networking system 140. The social networking system 140 includes a user profile store 205, a content store 210, an action logger 215, an action log 220, an edge store 230, a connection suggestion module 235, and a web server 240. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user, and may also include profile information inferred by the social networking system 140. In one embodiment, a user profile includes multiple data fields, each data field describing one or more attributes of the corresponding user of the social networking system 140. The user profile information stored in user profile store 205 describes the users of the social networking system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 140 displayed in an image. A user profile in the user profile store 205 may also maintain references to actions by the corresponding user performed on content items in the content store 210 and stored in the action log 220.

Additionally, a user profile includes information for communicating with a corresponding user outside of the social networking system 140. For example, the user profile includes one or more electronic mail (email) addresses for communicating content to the user through an email server, or other third party website 130, external to the social networking system 140. As another example, a user profile includes a telephone number or other contact information for interacting with a corresponding user through a communication channel outside of the social networking system 140.

While user profiles in the user profile store 205 are frequently associated with individuals, allowing people to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects representing various types of content. Examples of content represented by an object include a page post, a status update, a photo, a video, a link, a shared content item, a gaming application achievement, a check-in event at a local business, a brand page, or any other type of content. Objects may be created by users of the social networking system 140, such as status updates, photos tagged by users to be associated with other objects in the social networking system, events, groups or applications. In some embodiments, objects are received from third-party applications, which may be external to the social networking system 140. Content "items" represent single pieces of content that are represented as objects in the social networking system 140. Users of the social networking system 140 are encouraged to communicate with each other by posting text and content items of various types of media through various communication channels, increasing the interaction of users with each other and increasing the frequency with which users interact within the social networking system.

The action logger 215 receives communications about user actions on and/or off the social networking system 140, populating the action log 220 with information about user actions. Such actions may include, for example, adding a connection to another user, sending a message to another user, uploading an image, reading a message from another user, viewing content associated with another user, attending an event posted by another user, among others. In some embodiments, the action logger 215 identifies interaction between a social networking system user and a brand page within the social networking system 140, which communicates targeting criteria associated with content on the brand page to a content selector to customize content from the brand page. In addition, a number of actions described in connection with other objects are directed at particular users, so these actions are associated with those users as well. These actions are stored in the action log 220.

The action log 220 may be used by the social networking system 140 to track user actions on the social networking system 140, as well as external websites 130 that communicate information to the social networking system 140. Users may interact with various objects on the social networking system 140, including commenting on posts, sharing links, and checking-in to physical locations via a mobile device, accessing content items or other interactions. Information describing these actions is stored in the action log 220. Additional examples of interactions with objects on the social networking system 140 included in the action log 220 include commenting on a photo album, communications between users, becoming a fan of a musician, adding an event to a calendar, joining a groups, becoming a fan of a brand page, creating an event, authorizing an application, using an application and engaging in a transaction. Additionally, the action log 220 records a user's interactions with advertisements on the social networking system 140 as well as other applications operating on the social networking system 140. In some embodiments, data from the action log 220 is used to infer interests or preferences of the user, augmenting the interests included in the user profile and allowing a more complete understanding of user preferences.

The action log 220 may also store user actions taken on external websites, such as third party website 130. For example, an e-commerce website that primarily sells sporting equipment at bargain prices may recognize a user of a social networking system 140 through social plug-ins that enable the e-commerce website to identify the user of the social networking system 140. Because users of the social networking system 140 are uniquely identifiable, e-commerce websites, such as this sporting equipment retailer, may use the information about these users as they visit their websites. The action log 220 records data about these users, including webpage viewing histories, advertisements that were engaged, purchases made, and other patterns from shopping and buying.

In one embodiment, an edge store 230 stores the information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140.

The edge store 230 stores information describing characteristics of edges, such as affinity scores for objects, interests, and other users. Affinity scores may be computed by the social networking system 140 over time to approximate a user's affinity for an object, interest, and other users in the social networking system 140 based on the actions performed by the user. A user's affinity may be computed by the social networking system 140 over time to approximate a user's affinity for an object, interest, and other users in the social networking system 140 based on the actions performed by the user. Computation of affinity is further described in U.S. patent application Ser. No. 12/978,265, filed on Dec. 23, 2010, which is hereby incorporated by reference in its entirety. Multiple interactions between a user and a specific object may be stored in one edge object in the edge store 230, in one embodiment. In some embodiments, connections between users may be stored in the user profile store 205, or the user profile store 205 may access the edge store 230 to determine connections between users.

The connection suggestion module 235 receives contact entries from an importing user of the social networking system and identifies connections to other users of the social networking system based on the received contact entries. A contact entry includes contact information used by a system external to the social networking system 140 to communicate data between users. For example, contact information is an email address or a phone number. The connection suggestion module 235 compares contact information in a contact entry to user profiles in the user profile store 205 and identifies user profiles including information matching at least a portion of the contact information. For example, the connection suggestion module 235 identifies user profiles including an email address matching an email address specified by a contact entry. The connection suggestion module 235 identifies a user profile matching a contact entry to the importing user and may provide the importing user with a message to establish a connection with the identified user profile.

To increase user interaction with the social networking system 140, the connection suggestion module 235 also supplements existing information in a user profile with contact information from received contact entries including contact information matching a portion of the information in the user profile. For example, a user profile may specify a single email address that matches an email address included in a received contact entry. The contact entry may include additional email addresses or contact information not stored in the user profile, so the connection suggestion module 235 stores the contact entry and associates it with the user profile including the matching email address. In one embodiment, the contact entry is stored in the user profile store 205 and associated with the matching user profile; however, contact information from the contact entry is not presented or accessible to other users. This augments the existing information stored in the user profile with information from the received contact information.

After associating contact information from a stored contact entry with a user profile, contact information from subsequently received contact entries is compared to information in the user profile and the associated contact information. Hence, if information in either the user profile or the associated stored content entry matches a portion of the contact information from a subsequently received contact entry, the connection suggestion module 235 identifies that the user profile matches the subsequently received contact entry. Association of contact entries with user profiles is further described below in conjunction with FIG. 3.

The web server 240 links the social networking system 140 via the network 120 to the one or more client devices 110, as well as to the one or more third party websites 130. The web server 240 serves web pages, as well as other web-related content, such as JAVA®, FLASH®, XML and so forth. The web server 240 may provide the functionality of receiving and routing messages between the social networking system 140 and the client device 110, for example, instant messages, queued messages (e.g., email), text and SMS (short message service) messages, or messages sent using any other suitable messaging technique. A user may send a request to the web server 240 to upload information, for example, images or videos that are stored in the content store 210. Additionally, the web server 240 may provide API functionality to send data directly to native client device operating systems, such as IOS®, ANDROID™, WEBOS® or RIM.

Associating User Profiles with Received Contact Entries

Figure 3:
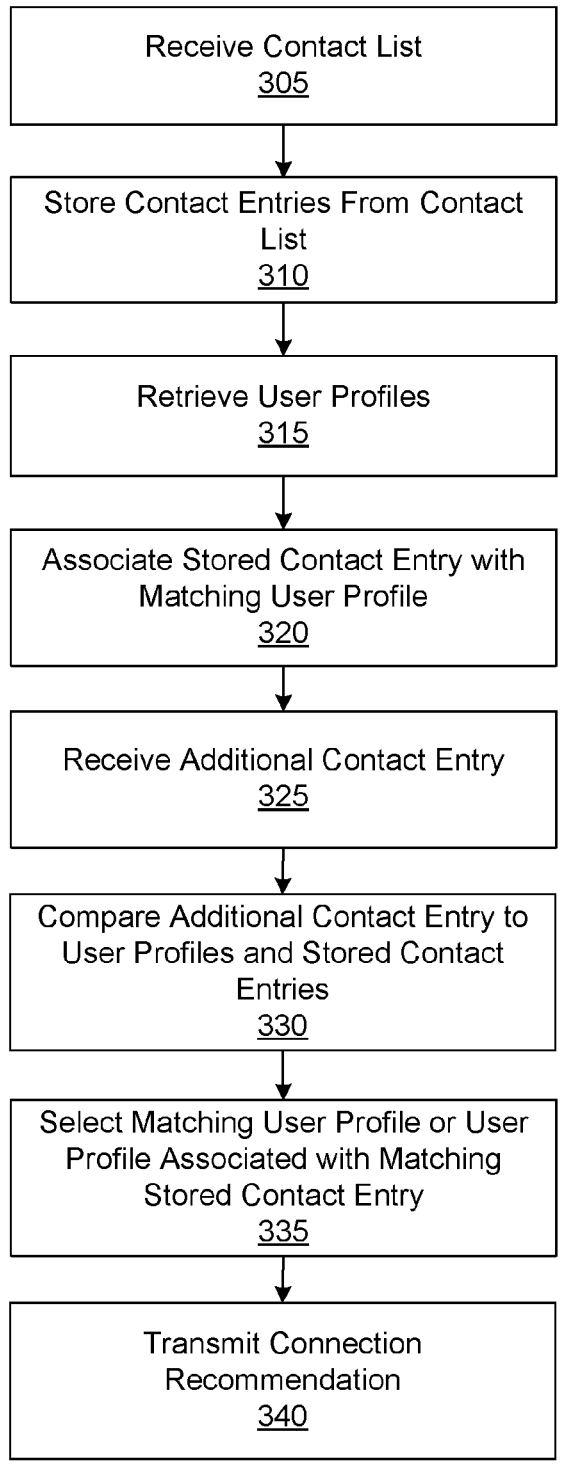
FIG. 3 is a flow chart of a method for associating received contact information with a user profile maintained by a social networking system, in accordance with an embodiment of the invention.

FIG. 3 shows a flow chart of one embodiment of a method 300 for associating a user profile maintained by the social networking system 140 with a received contact entry. The connection suggestion module 235 receives 305 a contact list from an importing user of the social networking system 140. One or more contact entries are included in the contact list, with each contact entry including contact information. For example, the contact list is one or more email addresses the importing user has stored in an address book or other repository. Various types of contact information may be included in a contact entry. For example, a contact entry may include an email address, a phone number, a screen name, and/or any other suitable information for exchanging data outside of the social networking system 140.

In one embodiment, the connection suggestion module 235 stores 310 contact entries from the contact list in the user profile store 205. For example, the contact entries are stored in the user profile associated with the importing user. In one embodiment, the stored contact entries are not accessible to other users of the social networking system 140. Alternatively, the contact entries may be stored 310 in the content store 210 or in any suitable location.

The connection suggestion module 235 retrieves 315 user profiles associated with social networking system users and compares information in the user profiles with contact information in the stored contact entries. If a user profile includes information matching at least a portion of the contact information in a stored contact entry, the connection suggestion module 235 associates the stored contact entry with the user profile including the matching portion of information. For example, a stored contact entry is associated with a user profile including an email address matching an email address in the contact entry. Hence, the connection suggestion module 235 supplements information in a user profile with additional information from received contact entries. Rather than rely on a user to update its corresponding user profile, current or modified user information may be obtained as contact information associated with the user as received, allowing the social networking system 140 to maintain more complete and/or current information about the user.

Additionally, the connection suggestion module 235 uses the stored contact entry associated with the user profile when an additional content entry is received 325. For example, the importing user provides one or more additional content entries to the connection suggestion module 235. Alternatively, a different user provides an additional content entry to the connection suggestion module 235. The connection suggestion module 235 compares 330 contact information in the additional contact entry to user profiles and stored contact entries associated with one or more of the user profiles. If the contact information in the additional contact entry matches a portion of the information in a user profile or matches a portion of the information in a stored contact entry associated with the user profile, the content selection module 235 selects 335 the user profile and transmits 340 a message to the importing user to establish a connection with a user associated with the selected user profile. In one embodiment, if the additional contact entry does not match a user profile and does not match stored contact entries associated with user profiles, the content selection module 235 transmits the importing user a message suggesting that the importing user invite the contact entity to establish an account with the social networking system 140.

For example, a user profile including an email address is associated with a stored contact entry including an alternate email address. An additional contact entry is received identifying the alternate email address. Because the alternate email address is different than the email address in the user profile, conventional techniques would not select the user profile. However, because the additional contact entry is compared to the user profile and to the stored contact entry including the alternate email address, which matches the information in the contact entry, the user profile is selected. Thus, even if the corresponding user does not update the user profile to include the alternate email address, the association between stored contact entry and user profile allows the alternate email address to be used by the social networking system 140 when recommending connections to establish.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some embodiments of the invention may utilize algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A system comprising:
a processor;
a non-transitory computer-readable storage medium coupled to the processor, the computer-readable storage medium having instructions encoded thereon that, when executed by the processor, cause the processor to:
    receive, at a social networking system, contact information for a plurality of contacts from a first user of the social networking system;
    store, by the social networking system, the contact information for the plurality of contacts in user profile information associated with the first user;
    retrieve stored user profile information associated with one or more other users of the social networking system, wherein the one or more other users do not include the first user;
    receive, at the social networking system, from the first user additional contact information for a particular user of the social networking system, wherein the one or more others users includes the particular user;
    determine, by a processor, which of the one or more other users of the social networking system are not connected to the first user in the social networking system based on the retrieved user profile information;
    compare the received additional contact information for the particular user with the retrieved user profile information associated with those of the one or more other users of the social networking system not connected to the first user;
    responsive to a match between at least a portion of the retrieved user profile information associated with a matching user of the one or more other users not connected to the first user and the received additional contact information for the particular user, select the matching user of the social networking system for recommendation; and
    recommend to the first user a connection be made between the first user and the matching user in the social networking system.

2. The system of claim 1, wherein contact information is selected from a group consisting of: an email address, a phone number, a screen name, and any combination thereof.

3. The system of claim 1, further comprising instructions that cause the processor to:
    invite the selected user to establish an account with the social networking system if no user profile or stored contact entry includes information matching at least a portion of the contact information included in the additional contact entry.

4. The system of claim 1, further comprising instructions that cause the processor to:
    determine whether the received contact information matches at least a portion of the stored user profile information associated with a particular user of the one or more other users; and responsive to the received contact information matching a portion of the stored user profile information associated with the particular user, add a remaining portion of the received contact information to the stored user profile information of the particular user.

5. The system of claim 4, wherein contact information is selected from a group consisting of: an email address, a phone number, a screen name, and any combination thereof.

6. A system comprising:
a processor;
a non-transitory computer-readable storage medium coupled to the processor, the computer-readable storage medium having instructions encoded thereon that, when executed by the processor, cause the processor to:
receive, at a social networking system, contact information for a plurality of contacts from a first user of the social networking system;
store, by the social networking system, the contact information for the plurality of contacts in user profile information associated with the first user;
retrieve stored user profile information associated with one or more other users of the social networking system, wherein the one or more other users do not include the first user;
responsive to a match between at least a portion of the retrieved user profile information associated with a particular user of the determined one or more other users not connected to the first user and the received additional contact information, associate the additional contact information with a user profile for the particular user;
receive, at the social networking system, additional contact information from an additional user of the social networking system, the additional user different from the first user;
compare the received additional contact information with information in the user profiles associated with other users and with information in contact entries associated with one or more of the retrieved user profiles;
responsive to a match between at least a portion of the retrieved user profile information and the received additional contact information, select a user associated with the contact information matching at least a portion of the additional contact information; and
recommend to the additional user a connection between the additional user and the selected user in the social networking system.

7. The system of claim 6, wherein contact information is selected from a group consisting of: an email address, a phone number, a screen name, and any combination thereof.

* * * * *